United States Patent Office 2,723,278
Patented Nov. 8, 1955

2,723,278
PREPARATION OF ALPHA-TOCOPHEROL

Joseph Donald Surmatis, Pompton Plains, and Joseph Weber, Paterson, N. J., assignors to Hoffmann-La Roche Inc., Roche Park, N. J., a corporation of New Jersey No Drawing. Application January 25, 1954,
Serial No. 406,079

4 Claims. (Cl. 260—345.5)

This invention relates to an improved process for making α-tocopherol. More particularly, it relates to such a process wherein phytyl chloride is condensed with trimethylhydroquinone in the presence of a boron trifluoride catalyst. In the practice of the invention on a large scale, the process thereof has made it possible to produce in excellent yield a vitamin E product characterized by its stable, light color and its comparative lack of odor and taste.

A preferred form of catalyst is a boron trifluoride etherate, and it is desirable to use this in such proportion as will present a boron trifluoride content of from about 0.03 mol (about 2.0 g.) to about 0.15 mol (about 10.2 g.) of boron trifluoride per mol (about 315.0 g.) of phytyl chloride. A preferred condition is the use of a boron trifluoride di(lower alkyl)etherate, and particularly boron trifluoride diethyl etherate, in such amount as to provide about 0.1 mol (about 6.8 g.) of contained $BF_3$ per mol of phytyl chloride. Boron trifluoride diethyl etherate is sometimes represented by the formula $BF_3 \cdot (C_2H_5)_2O$, but it should be understood that the invention is not limited to any specified formula for this or for any other boron trifluoride complex, since the active catalytic material is boron trifluoride itself, the etherates being however preferred forms of boron trifluoride catalyst. The phytyl chloride is advantageously used in approximately equimolar proportion to the trimethylhydroquinone. The condensation is desirably effected at a temperature in the range of from about 50° C. to about 85° C., a temperature of from about 60° C. to about 70° C. being preferred.

A comprehensive embodiment of the invention is illustrated by a process which has been practiced on a commercial scale in the manufacture of α-tocopheryl acetate, and which comprises a process of reacting isophytol with commercial concentrated aqueous hydrochloric acid to produce phytyl chloride, reacting the latter with trimethylhydroquinone in the presence of boron trifluoride diethyl etherate to form dl-α-tocopherol, and acetylating the latter to produce dl-α-tocopheryl acetate.

The invention is further disclosed in the following examples, which are illustrative but not limitative thereof:

Example 1

1.0 kg. of isophytol (about 95% pure) was placed in a flask together with 3.0 liters of 37% aqueous hydrochloric acid. The mixture was stirred for 2 hours at room temperature. The oil layer was separated, the aqueous acid layer was extracted with 500 cc. of petroleum ether, and the extract was added to the oil layer. The combined oils were washed twice, each time with 500 cc. of water, and dried overnight over 200 g. of anhydrous calcium chloride to yield dry phytyl chloride.

In a flask were placed 513 g. of trimethylhydroquinone (about 95% pure) and 3 liters of petroleum ether. The slurry was heated up to 80° C. while stirring. Then 25 cc. of a 45% by weight solution of boron trifluoride in diethyl ether were added. The total amount of phytyl chloride produced as described in the preceding paragraph was added dropwise at 80°–85° C. in the course of about 4 hours. The stirring was continued for an additional 2 hours at 80°–85° C. The reaction mixture was cooled to room temperature and filtered, then washed twice with water, and the solvent was removed by distillation under vacuum. The residue, α-dl-tocopherol, was a light-colored, yellow syrup.

To this residual syrup was added 800 cc. of acetic anhydride, and the reaction mixture was refluxed for 3 hours. The excess acetic anhydride was removed under a vacuum of about 20 mm. and the product was then distilled under a high vacuum to produce an almost water-white syrup of dl-α-tocopheryl acetate.

Example 2

5.0 kg. of isophytol (about 95% pure) was stirred with 15 liters of technical grade 37% aqueous hydrochloric acid at room temperature for about 2 hours. The acid layer was separated, extracted with petroleum ether and the extract added to the oil layer. The combined oils were washed twice with water and dried over calcium chloride to yield dry phytyl chloride.

2.705 kg. of trimethylhydroquinone (technical grade, about 95% pure), 20 liters of petroleum ether and 250 cc. of a 40% by weight solution of boron trifluoride in diethyl ether were charged to a kettle. The mixture was heated to about 60°–70° C., and the total amount of phytyl chloride produced as described in the preceding paragraph was added over a 2 hour period, keeping the temperature at about 60°–70° C.; all operations being conducted under a carbon dioxide atmosphere. After addition of the phytyl chloride, the temperature was maintained at about 60°–70° C. for 12 hours under an atmosphere of carbon dioxide. The reaction mixture was then washed twice with water and the solvent flashed off in vacuo to leave a light-colored syrup of dl-α-tocopherol.

The dl-α-tocopherol produced as described above was refluxed for 5 hours with 4 liters of acetic anhydride. The excess acetic anhydride was then distilled off under a water vacuum, and finally the residue was flash distilled in high vacuo. The dl-α-tocopheryl acetate thus produced was a clear viscous liquid having a very light yellow color and having little or no odor, sp. gr. 20°/15° = 0.958, and $n_D^{20} = 1.4968$.

We claim:

1. A process of making α-tocopherol which comprises condensing phytyl chloride with trimethylhydroquinone in the presence of a boron trifluoride catalyst.

2. A process of making α-tocopherol which comprises condensing phytyl chloride with trimethylhydroquinone in the presence of a boron trifluoride etherate providing from about 0.03 mol to about 0.15 mol of contained boron trifluoride per mol of phytyl chloride.

3. A process of making α-tocopherol which comprises condensing phytyl chloride with trimethylhydroquinone, in the presence of a boron trifluoride di(lower alkyl)etherate providing from about 0.03 mol to about 0.15 mol of contained boron trifluoride per mol of phytyl chloride, and at a temperature in the range of from about 50° C. to about 85° C.

4. A process of making α-tocopherol which comprises condensing phytyl chloride with trimethylhydroquinone in approximately equimolar proportion, in the presence of an amount of boron trifluoride diethyl etherate sufficient to provide about 0.1 mol of boron trifluoride per mol of phytyl chloride, and at a temperature in the range of from about 60° C. to about 70° C.

References Cited in the file of this patent

UNITED STATES PATENTS

| | | |
|---|---|---|
| 2,249,054 | Smith et al. | July 15, 1941 |
| 2,345,605 | John et al. | Apr. 4, 1944 |
| 2,411,942 | Smith et al. | Dec. 3, 1946 |
| 2,411,967 | Karrer | Dec. 3, 1946 |
| 2,421,811 | Smith et al. | June 10, 1947 |